Aug. 16, 1932. R. L. DAVIS 1,872,253
RECTIFIER SYSTEM
Filed March 13, 1931

WITNESSES
R. S. Williams
H. Melville Van Siver

INVENTOR
Robert L. Davis.
BY
ATTORNEY

Patented Aug. 16, 1932

1,872,253

UNITED STATES PATENT OFFICE

ROBERT L. DAVIS, OF GRAND RAPIDS, MICHIGAN, ASSIGNOR TO WESTINGHOUSE ELECTRIC & MANUFACTURING COMPANY, A CORPORATION OF PENNSYLVANIA

RECTIFIER SYSTEM

Application filed March 13, 1931. Serial No. 522,231.

My invention relates to rectifier systems and particularly to rectifier systems producing a higher number of secondary phases than the number of phases of alternating-current impressed thereon.

It is an object of my invention to rectify alternating currents of a certain number of phases and obtain a rectifier of a greater number of phases by utilizing a plurality of rectifiers, the anodes of which are less in number than the number of rectifier phases.

It is another object of the invention to provide apparatus for rectifying alternating currents, utilizing a group of transformer primaries which will, be for the most part, interchangeable.

It is a still further object of the invention to provide means for obtaining a direct current voltage higher than is ordinarily practical with mercury-arc rectifiers.

It is an ancillary object of the invention to provide transformer connections which will ensure stable phase relations of the desired angular displacement, and permit the circulation of third harmonic currents and multiples of the third, thus preventing their appearance on the supply line.

Other objects and advantages of my invention will become apparent from the following description and drawing, wherein.

Figure 1:
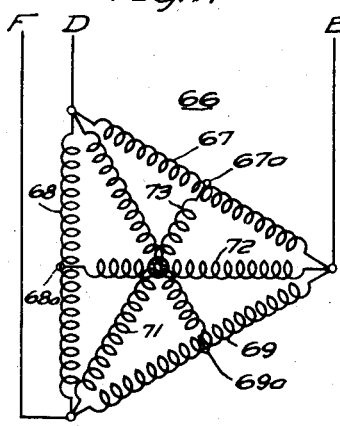
Fig. 1 is a schematic diagram of the primary coils of a three-phase transformer arranged with an angle of 30° between the secondary bases, and utilized in the second embodiment of my invention.

For illustration, the embodiments shown in the drawing are twelve-phase rectifiers. However, the basic principles embodied in the drawing and following description may be applied to other supply phases and other secondary multiples of the supply phase. The system may also be utilized to convert direct currents to alternating currents of a smaller number of phases by the insertion of well known apparatus in the rectifier circuits, such as that shown in Re. Patent No. 17,693 to L. W. Chubb.

Figure 2:
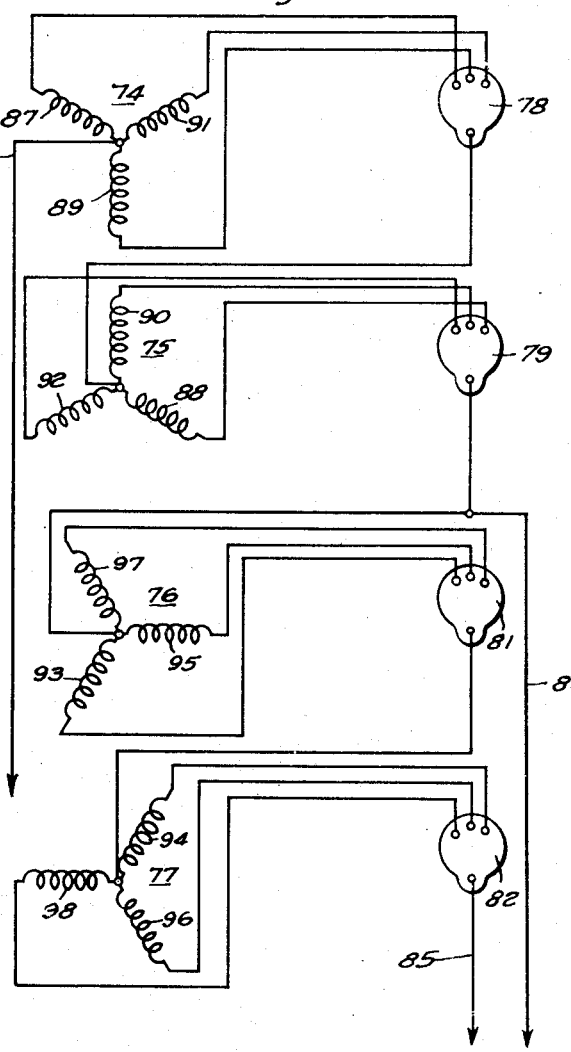
Fig. 2 is a schematic wiring diagram of the secondary coils of a transformer, the primary of which is shown in Fig. 1, and showing the connections to the mercury-arc rectifiers which may be utilized in my invention.
Figure 3:
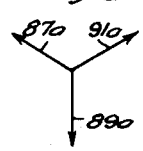
Figs. 3 to 6 are vector diagrams for each of the secondary coils of the transformer system shown in Fig. 2.
Figure 4:
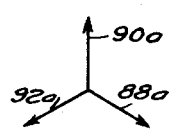
Figure 5:
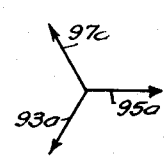
Figure 6:
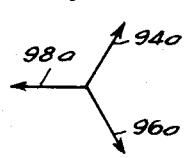

It is to be understood that single anode, as well as multi-anode tubes and high-vacuum hot-cathode tubes, may be utilized in place of multi-anode mercury-arc rectifier tubes with the same transformer connections shown in Figs. 1 and 2, and that the rectifiers may be connected in series or in parallel with a balance coil. Preferably, however, the rectifiers are connected in series.

The twelve-phase transformer operates with that six single-phase transformer coils employed in the primary to provide the proper voltage and phase relation for rectification into the desired direct-current energy. In this case, the secondary phases are displaced by an angle of 30°.

Connecting four stars in series in this manner also requires only a moderate inverse peak voltage per tube, when multi-anode rectifier tubes are used in spite of the unusually high direct current developed in the system, and by keeping the inverse voltage well within the conservative upper limit for mercury-vapor tubes, conditions most suitable for a long trouble-free life are obtained.

In the embodiment of my invention shown in Figs. 1 and 2, the primary 66 of the transformer is preferably constructed of a bank of coils 67, 68 and 69 arranged in a delta connection, and a second bank of coils 71, 72 and 73 arranged with cross branch connections not connected at their junction and having the ends of the cross branches lead across the triangle to points 67a, 68a and 69a which are substantially the mid-points of the delta-connected banks 67, 68 and 69. The angle between the phases is, therefore, 30°, and the points of the delta connected bank of coils are connected in a three-phase alternating-current line, D, E, F.

The secondary windings 74, 75, 76 and 77 of the transformer are arranged with two of the windings 76 and 77 displaced in phase by 120° to correspond to the primary windings 71, 72 and 73. One of each of the sets of secondary windings of varying phase is reversed in polarity, shown in Fig. 9 as transformer secondaries 75 and 77.

The connections for the secondary windings 74, 75, 76 and 77 of the transformer and the rectifier tubes 78, 79, 81 and 82 are such that the ends of each coil of each star is connected to the correct anode of the rectifier tubes, and the cathodes are connected to the mid-point of the following star. However, in Fig. 2, it is to be noted that six-phase direct current may be obtained between conductors 83 and 84, in addition to the twelve-phase direct current obtained between conductors 83 and 85.

Figure 7:
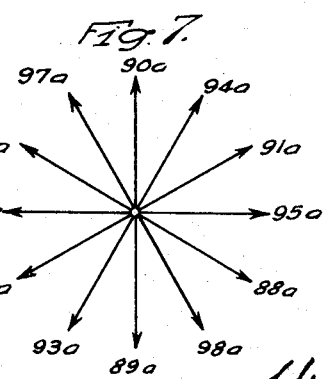
Fig. 7 is a complete vector diagram corresponding to direct-current output ripple voltage shown in Figs. 1 and 2.

The vector diagrams shown in Figs. 3 to 6 correspond to the coil windings of the secondaries of the transformers 74, 75, 76 and 77, and the numerals of the vectors correspond to the numerals on the separate coils. In Fig. 7, the vectors shown in Figs. 3 to 6 are superimposed one upon the other, and the resultant twelve-phase system is obtained, as shown by vectors 88a, 89a—98a.

From the foregoing description, it will be seen that I have invented a poly-phase rectifier which will allow the rectifier tubes to operate efficiently and will give a minimum ripple voltage as each phase is correctly displaced.

It will be apparent that the coils of the transformers will be interchangeable.

Although I have shown and described specific embodiments of my invention, it is understood that modifications and changes may be made by those skilled in the art without departing from the spirit and scope of the appended claims.

I claim as my invention:

1. Means for rectifying a basal-phase alternating-current source into direct current of four times the number of symmetrical phases comprising a transformer, and a plurality of rectifier tubes each provided with at least one anode, said transformer comprising primary and secondary windings connected to said source of alternating current, said primary comprising a delta-connected bank of coils and a cross-branched bank of coils, one set of ends of said cross branches being connected substantially at the mid-points of the delta-connected coils, and the other end of said cross branches being connected to the points of said delta-connected coils, four secondary coils connected in star, said coils being arranged to correspond in phase to said primary connected coils, a coil in each of the two phase angles connected in reverse polarity from the other coil of the particular phase, said rectifier tubes each being provided with a number of anodes corresponding to the number of secondary coils, means for connecting said anodes to their corresponding secondary coils, and means for connecting said rectifier tubes together.

2. Means for rectifying a three-phase alternating-current source into twelve-phase direct current having 30° between the phases comprising a transformer primary and secondary windings and a plurality of rectifier tubes each provided with a cathode and at least one anode, said primary windings being connected to said source of alternating current and comprising a delta-connected bank of coils and a cross-branched bank of coils, one set of ends of said cross branches being connected substantially to the mid-points of said delta-connected coils, and the other end of said cross branches being connected to the points of said delta-connected coils, four secondary windings of three coils connected in star, sets of two of which are each arranged to correspond to each phase angle of said primary coils, a coil in each of the two phase angles connected in reverse polarity from the other coil of the particular phase, means for connecting said anodes to their corresponding secondary coils, and means for connecting said rectifier tubes together through said secondary windings.

In testimony whereof, I have hereunto subscribed my name this 12th day of March, 1931.

ROBERT L. DAVIS.